Feb. 21, 1928.

A. G. RAYBURN

VEHICLE BRAKE

Filed Aug. 29, 1923

1,660,176

WITNESSES:

INVENTOR
ALDEN G. RAYBURN.
BY
his ATTORNEYS.

Patented Feb. 21, 1928.

1,660,176

UNITED STATES PATENT OFFICE.

ALDEN G. RAYBURN, OF SAUSALITO, CALIFORNIA, ASSIGNOR TO EMORY WINSHIP, OF SAN FRANCISCO, CALIFORNIA.

VEHICLE BRAKE.

Application filed August 29, 1923. Serial No. 659,920.

The invention relates to internal expanding brakes for use on vehicles.

An object of the invention is to provide an internal expanding brake in which the brake shoes are moved into substantially equal frictional contact, over their entire area, with the brake drum.

Another object of the invention is to provide an internal expanding brake in which the brake shoes are held from contact with the brake drum and, when the brakes are applied, are moved outward at all points into contact with the brake drum.

The invention possesses other advantageous features, some of which, with the foregoing, will be set forth at length in the following description, where I shall outline in full that form of my invention which I have selected for illustration in the drawings accompanying and forming part of the present specification. In said drawings I have shown two forms of apparatus embodying my invention, but it is to be understood that I do not limit myself to such forms, since the invention, as set forth in the claims, may be embodied in a plurality of other forms.

Referring to said drawings:—

Internal expanding brakes, usually comprise a brake drum within which there is arranged a pair of brake shoes which are mounted on the brake drum cover plate or axle housing flange and which are moved outward into frictional engagement with the brake drum. These shoes are usually substantially semicircular in shape and at one end are pivoted on a stud which is secured to the brake drum cover plate. At their other end the brake shoes are separated by a cam, which is moved to further separate the brake shoes, thus bringing them into contact with the drum. The brake shoes do not move radially outward but move about the stud on which they are pivoted, so that those portions of the shoes which are furthest remote from the pivot are pressed against the brake drum with a greater pressure than the other portions of the shoes. This results in inefficient braking, since the pressure of the brake shoes on the drum is not uniform at all points and is substantially negligible adjacent the pivot. In accordance with my invention I have provided a brake which operates to exert a substantially uniform pressure against the brake drum at all points of the surface of the brake shoe, thereby greatly increasing the efficiency of the brake and insuring uniform wear of the brake lining. In accordance with my invention I provide means for moving outward those ends of the brake shoes which are remote from the cam and which are usually pivoted on a fixed center. By moving these ends of the shoes outward and by moving the other ends of the shoes outward by means of the cam, the entire shoe is moved outward into substantially uniform engagement at all points of its surface with the brake drum.

Figure 1:
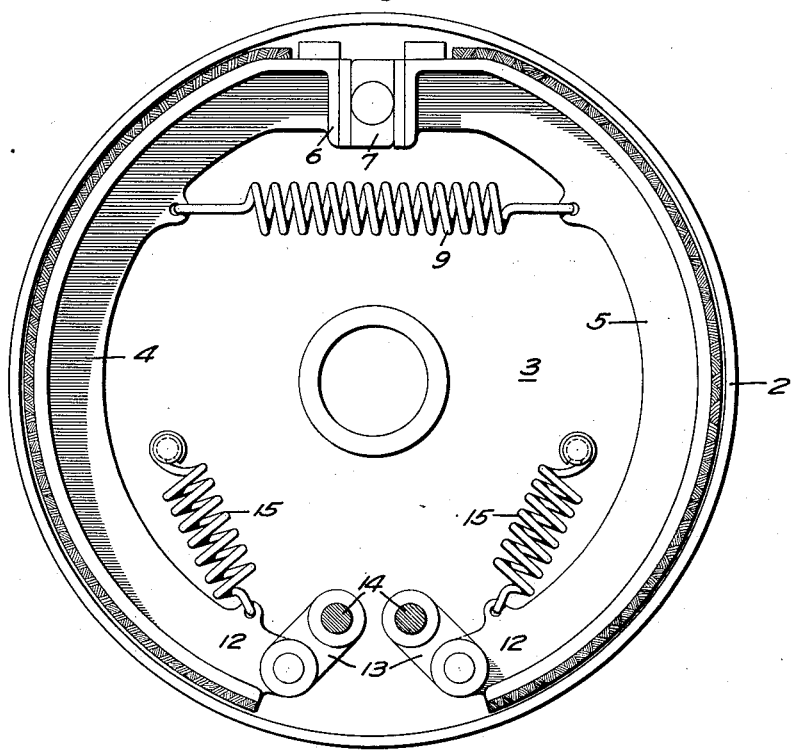
Figure 1 is a cross section through a brake drum showing one form of apparatus of my invention.

The brake of my invention comprises a brake drum 2 which is usually secured to the vehicle wheel and which is closed on its inner side by the closing plate 3, which usually comprises a flange on the end of the axle housing. Arranged within the brake drum are two substantially semi-circular brake shoes 4 and 5 having flat adjacent ends 6 between which the cam 7 is arranged. Rotation of the cam serves to spread apart the ends 6 of the brake shoes, thus moving them outward into engagement with the brake drum. The ends 6 of the brake shoes are held in contact with the cam by means of a spring 9 which also serves to move the shoes from contact with the drum when the cam is turned to neutral position. The ends 6 of the brake shoes are constrained to move outward in the direction of a chord of the circle of the brake drum by guides 8 and this outward movement is accompanied by a slight circumferential movement of the brake shoes, in the directions of the arrows shown in Figure 1. In accordance with my invention I provide means whereby the shoes are permitted to have this slight circumferential movement and whereby this movement causes an outward movement of the other ends 12 of the brake shoes. In the construction shown in Figure 1 the ends 12 of the brake shoes are mounted on links 13 which are pivoted on studs 14 secured to the cover plate 3. These links are so disposed, that circumferential movement of shoes forces the ends 12 of the brake shoes outward against the brake drum, thus bringing both ends and consequently the entire area of the brake shoes into contact with the brake drum. The circumferential movement of the brake shoes, which occurs when the brakes are applied, is resisted by the springs 15 which serve also to return the ends 12 of the brake shoes to their inward or free position when the cam 7 is returned to neutral position.

Figure 2:
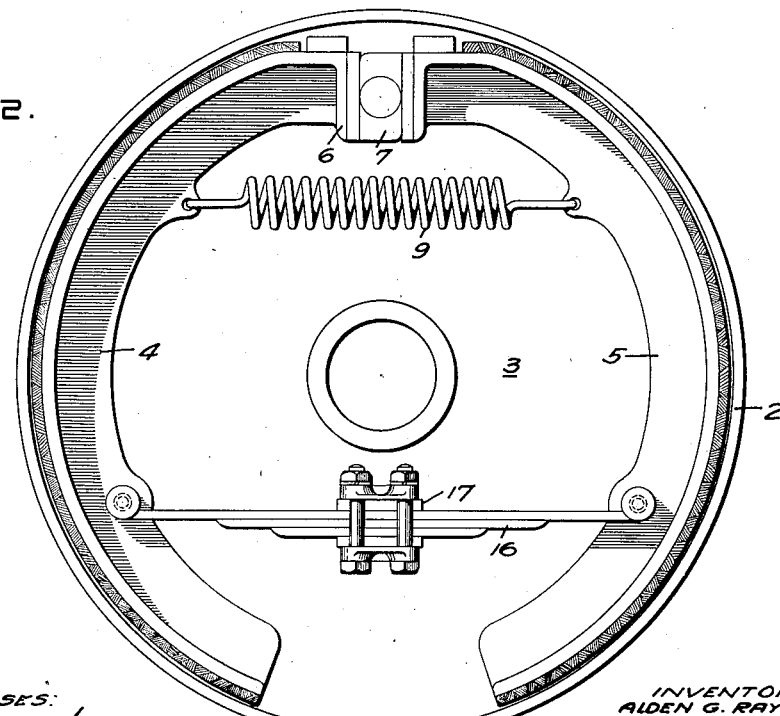
Figure 2 is a cross section through a brake drum showing a modified form of the apparatus.

In the construction shown in Figure 2 I have employed a resilient element which performs the functions of the links 13 and the spring 15. This resilient element comprises a leaf spring 16 clamped at its center to a projection 17 of the plate 3 and pivoted at its end, to the brake shoes 4 and 5 adjacent the ends 12. The free arms of the spring 16 act as links to cause an outward movement of the ends 12 of the brake shoes when the cam 7 is turned to apply the brakes and the resiliency of these arms serve to return the shoes to neutral or normal position when the cam 7 is returned to neutral position. By virtue of this construction the brake shoes are moved outward, against spring pressure into contact with the brake drum over their entire area and when the pressure on the cam 7 is released, the brake shoes are freed from the drum, thus eliminating all frictional contact.

I claim—

1. A vehicle brake comprising a drum, a pair of arcuate brake shoes adapted to be pressed against one face of said drum, means for moving one pair of adjacent ends of the shoes in opposite directions, guide means for constraining said ends to a combined radial and circumferential movement with respect to the drum, resilient means for constantly urging said ends together, and means pivotally connected adjacent the other ends of said shoes for constraining the same to a combined radial and circumferential movement with respect to the drum.

2. In a vehicle brake comprising a braking drum, an arcuate brake shoe positioned in juxtaposition to the face of said drum, a relatively stationary support, a link fulcrumed to said support at a point excentric to the center of the drum, said link being pivotally connected to the shoe adjacent one end thereof so that the shoe is constrained to follow an arcuate path which intersects the face of the drum, and means for moving the other end of said shoe substantially along a chord of said drum.

3. In a vehicle brake comprising a braking drum, an arcuate brake shoe positioned in juxtaposition to the face of said drum, a relatively stationary support, a link fulcrumed to said support at a point eccentric to the center of the drum, said link being pivotally connected to the shoe adjacent one end thereof so that the shoe is constrained to follow an arcuate path which intersects the face of the drum, spring means for normally retaining said shoe out of contact with said drum, and means for moving the other end of said shoe substantially along a chord of said drum.

4. A vehicle brake comprising a drum, a pair of arcuate brake shoes arranged to be pressed against a cylindrical face of said drum, a relatively stationary support, a pair of arms, each arm being pivoted at one end to said support and at its other end adjacent one end of one of said shoes to cause the shoes to swing on the arc of a circle that intersects said cylindrical face, means arranged between the other ends of said shoes to move the shoes away from each other, and guide means to restrict the outward movement of said last named ends and to cause said ends to move on a chord of said drum.

5. A vehicle brake comprising a drum, having a circumferential braking surface, a relatively stationary support, a plurality of arcuate brake shoes each secured to said support at one end in a manner permitting limited bodily circumferential and radial movement with respect to said surface, a cam carried by said support and arranged between adjacent ends of said shoes, and guides engaging said shoes adjacent said cam and restricting the movement of said shoes toward said surface and constraining said ends to move on a chord of said drum.

In testimony whereof, I have hereunto set my hand.

ALDEN G. RAYBURN.